G. W. LITTLEHALES 1,557,854

METHOD AND MEANS FOR FINDING GEOGRAPHICAL POSITION IN NAVIGATION

Filed Sept. 30, 1921  3 Sheets-Sheet 3

Inventor
George W. Littlehales
By Robert H. Young
Attorney

Patented Oct. 20, 1925.

1,557,854

UNITED STATES PATENT OFFICE.

GEORGE W. LITTLEHALES, OF WASHINGTON, DISTRICT OF COLUMBIA.

METHOD AND MEANS FOR FINDING GEOGRAPHICAL POSITION IN NAVIGATION.

Application filed September 30, 1921. Serial No. 504,480.

*To all whom it may concern:*

Be it known that I, GEORGE W. LITTLEHALES, a citizen of the United States, residing at 2132 Leroy Place NW., Washington, District of Columbia, have invented certain new and useful Improvements in Methods and Means for Finding Geographical Position in Navigation, of which the following is a specification.

This invention relates to methods for finding geographical position in navigation by observations of celestial bodies.

It is the principal object of the invention to afford an improved method by which position may be found more quickly and with less mental effort than has been possible in the past. Aside from usefulness in marine navigation, this method is especially adapted for use in aerial flight, wherein conditions obtain which make position finding a more difficult problem than in the former branch of navigation.

According to methods heretofore employed in marine navigation, such as Sumner's method for instance, it has been necessary to make more than one observation of a chosen celestial body and to separate these observations by a considerable length of time. It has been necessary to remain immobile between observations, or to measure very accurately the extent and direction of movement, when compelled to continue on the course. These conditions can be satisfied in marine navigation, wherein the ship on which the navigator is sailing can be stopped or sailed on a definite course for a determinable distance. In aerial flight, however, a cruising aircraft cannot suspend its motion, nor is it practicable to fly over a definite, measured course under conditions which make astronomical observations necessary in position finding.

A further object in view is the provision of a chart designed to facilitate practice of the improved method. It is intended that this chart shall bear a diagram and certain data which will enable the navigator to follow the method without having to make tedious calculations. A pilot has to focus his attention on so many things in the performance of his usual duties that a position finding method involving numerous mathematical computations would be burdensome and impracticable.

The improved method is based upon the principle that at any instant of time there is a series of positions on the earth at which a celestial body appears at the same given altitude and that these positions lie in the circumference of a circle marked out by a radius arm whose pivot is that geographical position which has the body in its zenith and whose length is the same arc-measure as the zenith distance or the complement of the altitude. The method proceeds to recognize that the difference of the simultaneous altitudes of the same celestial body at two geographical positions is the shortest great circle arc-distance between the circles of equal altitude passing through the two places. By supplying the altitudes and azimuths of the celestial bodies as they would appear at stated intervals of time in a chosen geographical position within the limits of the chart, an observer, in a position as yet unknown, having measured the altitude of a celestial body, may at once lay down the locus of his position by comparing the altitude so measured with the tabulated altitude of that body and laying off the difference between the measured and tabulated altitudes as an intercept from the chosen geographical position in the direction of the azimuth of the celestial body and toward or away from the bearing of the body according as the measured altitude was higher or lower than the tabulated altitude.

It is proposed to construct a chart for the geographical area that is to be traversed in any particular cruise or aerial flight. This chart will include a map of the area, a record of the altitudes and azimuths of various celestial bodies as observed from a selected known position on the map at stated intervals of time, and a diagram by the use of which the altitude-difference intercept may be laid off readily.

By way of concrete example, the inventive idea may be expressed in the method steps specified in the following description and in the specific form of chart illustrated in the accompanying drawings, in which:

Figure 4 is of like nature with Figure 3, being an expression of equation (4) page 4, whereas Figure 3 is an expression of equation (3), same page;

In order to make clear the fundamental principles underlying the invention and to illustrate its practical application to some branch of navigation, the construction and use of a chart for an aerial flight over the central part of the United States will be considered.

It may be well, at this point, to define a few of the terms used in the specification and claims. For instance, "chart" is employed to designate the sheet, tablet, or other member having a surface on which the map, tabulated measurements, diagram, or a substitute for the tabulated measurements, such as the supplementary diagram described later in the specification, or any other parts of the entire organization of lines and indicia, are delineated. That part of the organization which is a conventional representation of part of the earth's surface has been termed the "map." The "diagram" is the system of lines overlying part of the map which facilitates determination of position when certain preliminary data has been obtained.

Figure 1:
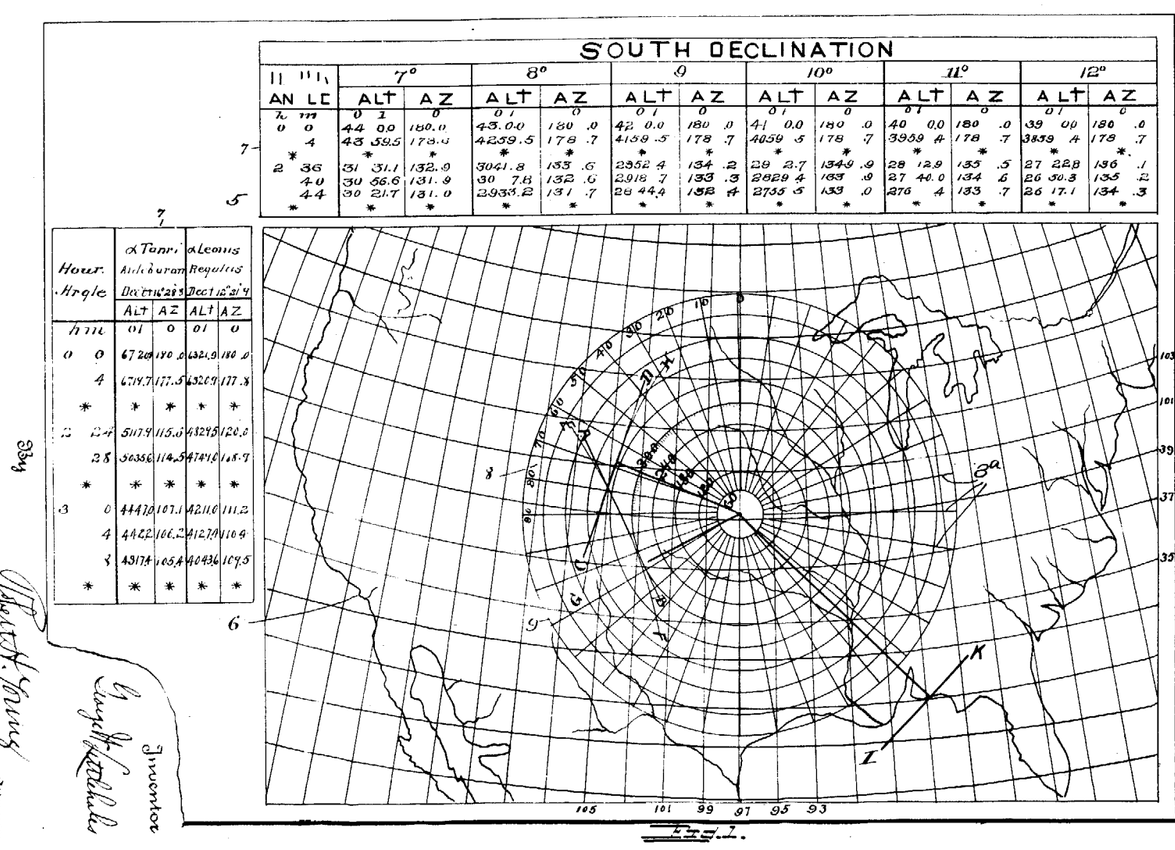
Figure 1 is a plan view of a chart constructed for aerial flight over the central part of the United States of America, showing loci marked thereon in finding position at two points within the represented area.

Referring to Figure 1 of the drawings, the numeral 5 designates the chart, which may be of any suitable type or form. A flat chart has been selected for the purposes of disclosure. The geographical area to be traversed is represented on the face of the chart by map 6. In the case of a flat chart, the map should be constructed upon a system of projection having such qualities that angles are preserved nearly true, that the great circle is practically a straight line, and that there is uniformity of scale within the required limits of tolerance. Zenithal projection is considered to be the most suitable for this purpose, but polyconic, or any other system which possesses the qualities enumerated, may be utilized.

It being assumed that the flight is to be made over the central part of the represented area, some known position in the middle of the map is selected as a reference point, and a record is made of the simultaneous altitudes and azimuths of certain celestial bodies as measured by an observer stationed in the selected position at regular intervals of time. Intervals of 4 minutes of hour angle from the observer's meridian are suitable for this purpose. Besides the altitudes and azimuths of the brighter stars, the record should embrace the range of the declination, both north and south of the equator, of the sun, the moon, and the planets.

Table 7, in Fig. 1, is an extract from the complete record which might be obtained of measurements made in latitude 39° and longitude 97°, which has been chosen for the reference point in this example. On this table, while the azimuth is stated in degrees and tenths of a degree, the altitudes are set down in degrees and minutes, since the minute of altitude corresponds closely with the geographical mile. Future experience is relied upon to dictate whether the altitude should be expressed in degrees and decimals of a degree instead of degrees and minutes.

A large compass diagram 8, consisting of radial lines 8ª graduated in degrees of azimuth has been delineated on the map with its center at the reference point in latitude 39° and longitude 97°, since all the altitude differences are to be laid off from there; and circumferences 9 concentric to this point have also been supplied, in order that, with a given altitude-difference, the observer may at once proceed to find the point through which his line of position is to be drawn, by passing out by the amount of the altitude-difference to the proper drawn or intermediate circumference along the radial indicated by the azimuth ascertained from table 7.

The following example, whose solution is indicated by the intersection of the lines AB and CD on the map, will afford a specific illustration of the proposed method of finding position by the use of the chart.

Example:— Being in flight between Leavenworth, Kansas, and San Francisco,

California, during the night of February 1, 1917, at 6 h. 59 m. 14 s. by a watch regulated to sidereal time of the meridian of the central position of the map (97° or 6 h. 28 m. west of Greenwich), observed simultaneous altitudes of α Tauri (Aldebaran), bearing westward, and α Leonis (Regulus), bearing eastward. By horizon-free sextant true altitude of α Tauri, 55° 35′ and of α Leonis 35° 13′.

Find the geographical position of the observer.

Solution:

|  | α Tauri (Aldebaran). | α Leonis (Regulus). |
|---|---|---|
|  | h. m. s. | h. m. s. |
| Local Sidereal time | 6 59 14 | 6 59 14 |
| Right ascension | 4 31 12 | 10 04 00 |
| Hour angle | 2 28 02 | 3 4 46 |

With these hour angles entering the tabulation on the chart under the names of these stars............ Az. N. 114° .5 W.      N. 110° .1 E.

|  | Alt. | | | | |
|---|---|---|---|---|---|
| Measured altitude | 50° | 34′ | | 41° | 19′ |
|  | 55° | 35′ | | 35° | 13′ |
| Altitude-difference | | 5° | 01′=301′ | 6° | 06′=366′ |

In direction—  
N. 114° .5 W. or (180°+110° .1)=290° .1 or  
S. 65° .5 W.      N. 69° .9 W.

In direction—

The right ascension of each star is obtained by reference to a Nautical Almanac covering the date of observation.

The position-lines, or loci, resulting from these observations have been plotted on the map by passing out to the distance circumference 301 (=5° 01′) along the radial N. 114° .5 W. and through the point thus arrived at, drawing the position-line AB at right angles to the radial; and, likewise, by passing out to the distance circumference 366 (=6° 06′) along the radial N. 69° .9′ W., and through the point thus arrived at, drawing the position-line CD at right angles to this radial. The intersection of these position-lines fixes the geographical position approximately over the city of Denver in latitude 39° 45′ N. and longitude 105° W.

To amplify the illustration, a second example is presented as follows:

Example:—An observer in aerial flight along the coast of the Gulf of Mexico, during the morning of October 14, 1917, measures the true altitude of the sun's center to be 40° 14′ at 9 h. 06 m. 06 s. a. m. by a watch regulated to mean time of the meridian 97°, or 6 h. 28 m. west of Greenwich. From the Nautical Almanac, the equation of time and sun's declination at time of observation are ascertained to be:

Eq.T.=13 m. 54 s. + to m.t., Dec. 8° 5′ .4 S.

Find the position line upon which the observer is located; and, by noting the intersection of this line with the coast line, the observer's geographical position.

$$\begin{array}{rl} & h.\ m.\ s. \\ \text{L. M. T.} = & -9\ 06\ 06 \\ \text{Eq. T.} = & +\ 13\ 54 \\ \hline \text{L. A. T.} = & -9\ 20\ 00 \\ \text{H. A.} = & -2\ 40 \quad \text{Dec.} = -8°\ 5\ 4 \end{array}$$

Entering the tabulation on the chart with these values of the H. A. and Dec............ Az. 132° .7

Alt. 30° 04  
Alt. 42° 16′

12° 12′=732′ in direction N. 132° .7 E.

Passing out to the distance 732 along the radial N. 132° .7 E., and drawing a position-line IK at right angles to the radial, locates the aircraft on the coast a little to the eastward of Pensacola.

Under self-imposed restrictions adopted in consideration of the circumstances and limited equipment of the aerial navigator, a solution of these observations for geographical position has been reached that is without the defaults which arise from treating the great circle arc of altitude-difference as a rhumb-line, and the exactitude with which the result has been reached would, if the scale of the chart had not been reduced, be sufficient to meet the requirements of aerial navigation. The availability of charts of like design will also prove efficient in meeting the required greater exactitude of marine navigation, if, instead of drawing the line of position as a straight line, the actual curve of the "circle of equal altitudes" be employed. This has the curvature on the present chart of a parallel of latitude representing a latitude equal to the altitude of the celestial body observed to obtain the "circle of equal altitudes."

In this manner, the actual curves EF and GH for which the straight lines AB and CD were substituted have been supplied by the side of them so that a comparison may be made, in the case in point, between the position indicated by the intersection of AB and CD and that obtained by the intersection of the arcs of the actual "circles of equal altitudes."

Attention should perhaps be drawn to the fact that, although it may not be found inconvenient to consult a complete set of tables in actual flight, it is better to extract portions for any particular flight, as has been done for the solution of the foregoing problems. Of course, it will not be overlooked that these tables would, without modification, serve a like purpose in relation to a similar chart of any other part of the world traversed by the 39th degree parallel of latitude, either in the Northern or Southern Hemisphere.

Having described the general nature of the method, means for facilitating its practice, and the use of both in solving two concrete problems in position finding, the method may be analyzed into the following steps:

1. Measurement of the altitude of one or more visible celestial bodies at a definite instant of time by the observer at the unknown position to be located;

2. Determination, by reference to a chronometer and to recorded data, of the time of observation, the right ascension, and the altitude and azimuth of each body at a known position at the time of measurement of the altitude at the unknown position;

3. Calculation of the difference between the altitude of each body at the known position and that at the unknown position;

4. Locating on a map, in the case of each body, a point spaced from the known position in the direction of the azimuth at a distance representing the altitude difference; and 5. Delineation on the map of a position-line through each of the said points at right angles to the corresponding azimuth and of such length that each will intersect the other, or some represented geographical feature which is visible to the observer, to locate the unknown position.

The foregoing analysis is general enough to cover observations of a plurality of celestial bodies at night, when they are visible, and also observation of the sun in the daytime, when it alone can be seen. Examples 1 and 2 involve both of these situations and show the slight modifications in the method necessary to meet these different situations.

Figure 2:
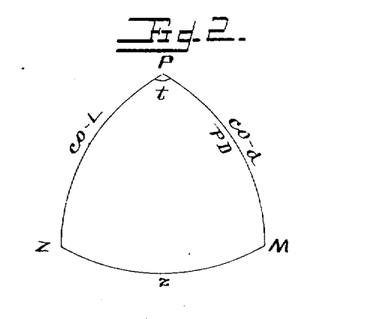
Figure 2 represents a spherical triangle showing the parts whose relation is expressed in the fundamental equation (equation (1) page 4 of the following specification)

In order to reduce further the time and mental effort required in finding position according to this method, a graph has been devised which enables the observer to determine altitude, azimuth, or hour-angle, without making extensive mathematical calculations or referring to tabulated data. This supplementary graph is based on a formula for finding the zenith-distance in which the haversine is the only function employed. (See page 157 American Practical Navigator, N. S. Hydrographic Office Publication No. 9, Edition of 1920.) (See polar triangle in Fig. 2.) The formula may be stated in the form $$\text{hav } z = \text{hav}(Co-L-PD) + \{\text{hav}(Co-L+PD) - \text{hav}(Co-L-PD)\}\text{hav } t, \quad (1)$$

but may perhaps be made to appear in more familiar terms by employing the symbols for latitude, L, and declination, $d$, instead of those for co-latitude, co-L, and polar distance, PD, as follows:

$$\text{hav } z = \text{hav } L \sim d + \{\text{hav}(180° - [L+d]) - \text{hav}(L \sim d)\}\text{hav } t. \quad (2)$$

It may be re-written for computing a time-sight or hour-angle, thus:

$$\text{hav } t = \frac{\text{hav } z - \text{hav}(L \sim d)}{\text{hav}(180° - [L+d]) - \text{hav}(L-d)} \quad (3)$$

and, by analogy, for computing the azimuth, thus:

$$\text{hav } Z = \frac{\text{hav}(90° \sim d) - \text{hav}(L-d)}{\text{hav}(180° - [L+d]) - \text{hav}(L-d)}. \quad (4)$$

Writing the formula in the following symmetrical form $$\text{hav } z - \text{hav}(Co-L-PD) = \{\text{hav}(Co-L+PD) - \text{hav}(Co-L-PD)\}\text{hav } t, \quad (5)$$

it is evident that, when the observed celestial body is on the upper branch of the meridian of the observer, that is, when $t$ is equal to zero, the right-hand member of the equation reduces to zero since the haversine of 0° is equal to zero, and therefore, $$\text{hav } z = \text{hav}(Co-L-PD) = 0$$

or $$\text{hav } z = \text{hav}(Co-L-PD) \quad (6)$$

which is equivalent, as it should be, to the usual statement of the formula for finding the latitude from the meridian altitude of a celestial body culminating above the elevated pole of the observer, and, moreover, when the observed celestial body is on the lower branch of the meridian of the observer, that is, when $t$ is equal to $12^h$ or 180°, the right-hand member of the equation becomes $$\text{hav}(Co-L+PD) - \text{hav}(Co-L-PD)$$

since the haversine of 180° is equal to unity, and therefore, $$\text{hav } z - \text{hav}(Co-L-PD) = \text{hav}(Co-L+PD) - \text{hav}(Co-L-PD) \quad (7)$$

or $$\text{hav } z = \text{hav}(Co-L+PD)$$

which is equivalent to the usual statement of the formula for finding the latitude from the meridian altitude of a celestial body culminating below the elevated pole of the observer.

Employing Cartesian rectangular co-ordinates, and letting $y = \text{hav } z$
$a = \text{hav } (L \sim d)$
$x = \text{hav } t$
$$m = \frac{\text{hav } [180° - (L+d)] - \text{hav } [L \sim d]}{\text{hav } 180°}$$

equation (2) will be transformed into $$y - a = mx$$

which is the equation to a straight line intersecting the axis of Y at a distance $a$ above the origin and passing through the first quadrant at an angle of inclination to the axis of X whose tangent is $m$.

Figure 3:
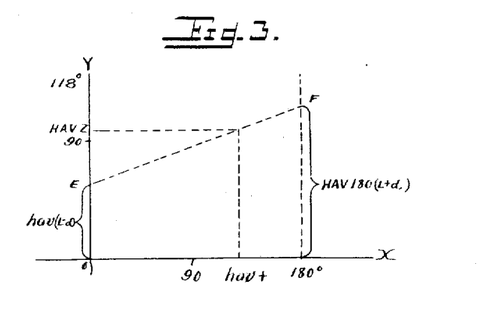
Figure 3 represents the method of showing the relation of the parts shown in Figure 2 and in the fundamental equation with reference to Cartesian rectangular coordinate whose abscissæ and ordinates are the haversines of angles ranging from 0° to 180°.

If the axes of Y and X be graduated on the same scale to represent the haversines of angles, commencing with 0° at the origin designated by the letter O in Fig. 3, and extending to 180° in each case, the line EF will be the graph of the equation $y - a = mx$, and hence of $$\text{hav } z - \text{hav } (L \sim d) = \{\text{hav } 180° - (L+d) \text{ hav } (L \sim d)\} \text{hav } t.$$

The length of the ordinate to the line EF, corresponding to any given value of $t$ on the scale, OX, of abscissæ representing the values of $t$, will mark the value of $z$ on the scale OY of ordinates representing the values of hav $z$; and conversely, the abscissa corresponding to any given value of $z$ (as when the altitude of a celestial body is measured in taking a time-sight) on the scale of ordinates, OY, will mark the value of the hour-angle, $t$, on the scale of abscissæ, OX.

Figure 4:
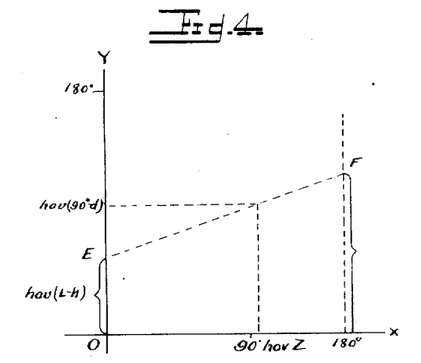

In like manner, equation (4) for finding the azimuth, Z, in which Z appears in the place of $t$, and the altitude, $h$, in place of the declination, $d$, may be represented by a straight line whose rectangular co-ordinates, as represented in Fig. 4, are hav Z and hav $(90° \sim d)$, respectively, and whose inclination to the axis of abscissæ in hav Z is an angle whose tangent is equal to $$\frac{\text{hav } [180° - (L+h)] - \text{hav } [L \sim h]}{\text{hav } 180°}$$

Figure 5:
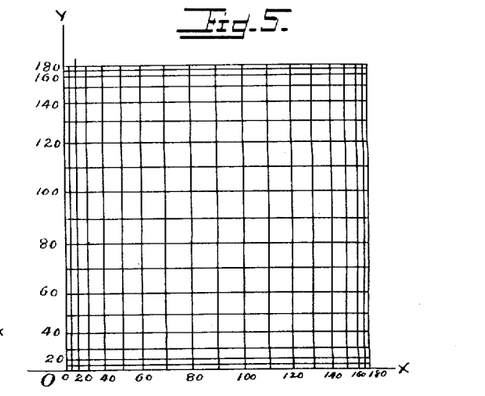
Figure 5 represents the first quadrant of the system of Cartesian rectangular coordinates with the ordinates drawn from the points of subdivision of the scale of haversines of angles, ranging from 0° to 180°, on the axis of abscissæ 0ˣ and also on the axis of ordinates, OY.

The necessity for drawing co-ordinates may be obviated by extending the ordinates from the division marks of the scales of haversines constructed along the axes OX and OY and thus forming a grillage of rectangles as shown in Fig. 5.

If the right-hand border of the grillage be numbered in the reverse order from the left-hand border, that is, from 180° at the bottom to 0° at the top, the right-hand ordinate will be $L+d$ in finding the hour-angle and the zenith-distance, and $L+h$ in finding the azimuth, instead of $180° - (L+d)$ and $180° - (L+h)$ as indicated in Figs. 3 and 4 in these respective cases. Hence the following rules, by which an illustrative example given below is solved upon the finished altitude and azimuth diagram of Fig. 6 may be laid down for solving the azimuth and altitude or zenith-distance for finding the position-line by the Saint Hilaire method, and also the time-sight with a degree of precision governed by the scale of construction.

(1) To find the azimuth (Z). Mark the value of $(L-h)$ on the left-hand scale, and the value of $L+h$ on the right-hand scale. Connect these two markings by a straight line. Mark the intersection of this line with the horizontal line from the value of the polar distance $(90° \sim d)$ found on the left-hand scale. The vertical line from this intersection will mark, on either the top or the bottom scale, the value of Z.

(2) To find the zenith-distance $(z)$, mark the value of $(L \sim d)$ on the left-hand scale, and the value of $L+d$ on the right-hand scale. Connect these two markings by a straight line. Mark the intersection of this line with the vertical line from the value of the hour-angle $(t)$ found on the top or bottom scale. The horizontal line from this intersection will mark on the left-hand scale, the value of $z$.

(3) When the altitude, and hence the zenith-distance, is known by measurement, by reversing the last two steps in rule 2, the hour-angle may be found.

Figure 6:
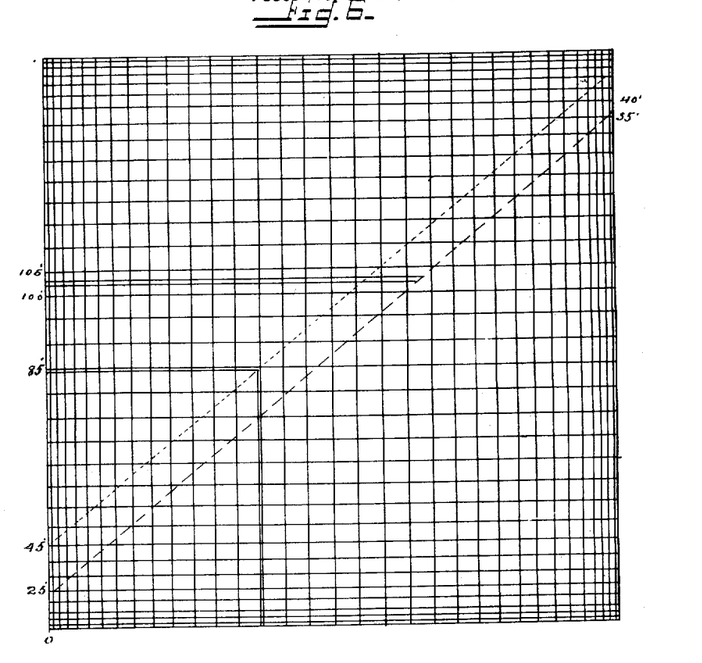
Figure 6 is intended to illustrate the use of the construction shown in Figure 5 for the purpose of finding the altitude and azimuth of a celestial body, to be employed in combination with the chart shown in Figure 1.

In order to illustrate the use of the graph, the following problem in determination of altitude and azimuth may be solved:

Example:—
Given hour-angle, $t = 5$ h. 1 m. 17 s.
declination, $d = 12° 36'$
latitude, $= +32° 52'$
Find the altitude and azimuth.
Solution:

On the grillage of Fig. 6, by rule 2, plotting $L \sim d = 45° 28'$ on the left-hand border scale and $L+d = 20° 16'$ on the right-hand border scale and connecting these two points by a straight line (which is represented on the diagram by short dashes but which need not be drawn in practice if a ruler be laid, or a cord be stretched, between the points on the border scales), the ordinate on the left-hand scale corresponding to the abscissa $t = 5$ h. 1 m. 17 s. is indicated to be 84° 54', which is the zenith-distance, $z$. Hence the altitude, $h = 90° - z = 5° 6'$.

Having now found the altitude, by rule 1, plot $L - h = 27° 46'$ on the left-hand scale and $L+h = 37° 58'$ on the right-hand scale and connect these points by a straight line (which is represented on the diagram by long dashes). The abscissa on the top or the bottom scale corresponding to the ordinate, PD = 90° ~ d = 102° 36' on the left-hand scale, is indicated to be 108° 35', which is the azimuth counted from the north.

The supplementary diagram, when substituted for the tables, should make it possible for an aerial navigator to find his position even more quickly than by use of the tables. He has with him the equivalent of a volume on nautical astronomy in a form simple enough to fulfill the instant needs of flight.

In Figure 1, the diagram of circles of equal altitudes and compass bearings covers only a limited area. Should the navigator happen to pass outside the area represented by this diagram, the circumference of an additional circle of equal altitudes, or an arc of such a circumference, must be drawn on the map for use in finding position. For assistance in the delineation of the additional circumference, or arc, the template shown in Figure 7 has been provided. This template is made preferably of celluloid, or some other transparent material. It has a centering indication 10 and a plurality of arcuate slots 11 concentric to indication 10. The slots are graduated in minutes of arc-measure and are adapted to receive and guide the point of a pencil, or other marking instrument.

Figure 7:
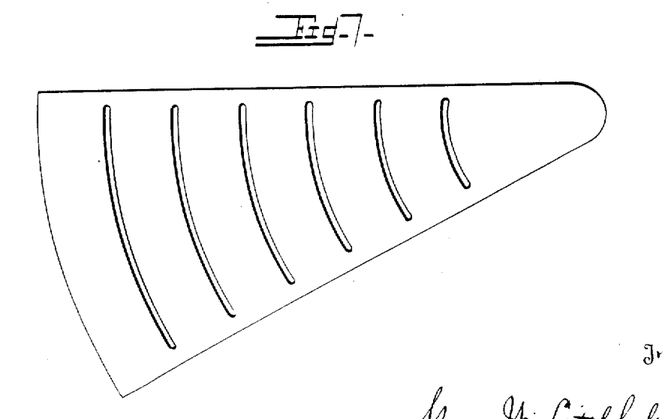
Figure 7 is a plan view of a template for use in drawing the circumferences of circles of equal altitudes.

In using the template, the centering indication 10 is placed in registration with a known position on the map, and that slot which is spaced from indication 10 a distance representing the altitude difference determined in solving the problem is used as a guide in drawing the desired arc.

There is another feature of the invention which should be considered. The graphical diagram of Figure 6 is shown separate from the main chart bearing the map. It is to be understood, however, that the graphical diagram is preferably delineated on an integral part of the chart in lieu of the tables 7. This construction could not be shown in the accompanying drawings, due to the limited space available on each sheet, so the graphical diagram had to form the subject of a separate figure of drawing.

I claim:

1. An astronomical position-finding chart bearing a representation of a geographical area, and means for indicating azimuth with respect to a known position on the said representation.

2. An astronomical position-finding chart bearing a representation of a geographical area, means for indicating azimuth with respect to a known position on the said representation, and means for indicating altitude-differences radially with respect to the known position.

3. An astronomical position-finding chart bearing a representation of a geographical area, and a compass diagram overlying the said representation with its center coincident with a known position thereon.

4. An astronomical position-finding chart bearing a representation of a geographical area, a compass diagram overlying the said representation with its center coincident with a known position thereon, and means for indicating altitude-differences radially with respect to the known position.

5. An astronomical position-finding chart bearing a representation of a geographical area, a compass diagram overlying the said representation with its center coincident with a known position thereon, and circles of equal altitude delineated on the compass diagram concentric thereto.

6. An astronomical position-finding chart bearing a representation of a geographical area, and circles of equal altitude delineated on the said representation concentric to a known position thereon.

7. An astronomical position-finding chart bearing a representation of a geographical area, circles of equal altitude delineated on the said representation concentric to a known position thereon, and means for indicating azimuth with respect to the said known position.

8. The combination with an astronomical position-finding chart bearing a representation of a geographical area, of means for indicating azimuth with respect to a known position on the said representation, and means for determining the value of the altitude and of the azimuth that a celestial body would have in the known position at predetermined instants of time.

9. The combination with an astronomical position-finding chart bearing a representation of a geographical area, of means for indicating altitude differences radially with respect to a known position on the said representation, and means for determining the value of the altitude and of the azimuth that a celestial body would have in the known position at predetermined instants of time.

10. The combination with an astronomical position-finding chart bearing a representation of a geographical area, of means for indicating azimuth with respect to a known position on the said representation, means for indicating altitude-differences radially with respect to the known position, and means for determining the value of the altitude and of the azimuth that a celestial body would have measured in the known position at predetermined instants of time.

11. The combination with an astronomical position-finding chart bearing a representation of a geographical area, a compass diagram overlying the said representation with its center coincident with a known position thereon, and means for determining the value of the altitude and of the azimuth that a celestial body would have in the known position at predetermined instants of time.

12. The combination with an astronomical position-finding chart bearing a representation of a geographical area, a plurality of circles of equal altitude delineated on the said representation concentric to a known position thereon, and means for determining the value of the altitude and of the azimuth that a celestial body would have in the known position at predetermined instants of time.

13. The combination with an astronomical position-finding chart bearing a representation of a geographical area, a compass diagram overlying the said representation with its center coincident with a known position thereon, a plurality of circles of equal altitude delineated on the said representation concentric to the known position, and means for determining the value of the altitude and of the azimuth that a celestial body would have in the known position at predetermined instants of time.

14. An astronomical position-finding chart bearing a representation of a geographical area, means for indicating azimuth with respect to a known position on the said representation, and a record of the altitudes and azimuths of a celestial body measured at the known position at predetermined instants of time.

15. An astronomical position-finding chart bearing a representation of a geographical area, means for indicating altitude differences in a radial direction with respect to a known position on the said representation, and a record of the altitudes and azimuths of a celestial body measured at the known position at predetermined instants of time.

16. An astronomical position-finding chart bearing a representation of a geographical area, means for indicating azimuth with respect to a known position on the said representation, means for indicating altitude differences in a radial direction with respect to the known position, and a record of the altitudes and azimuths of a celestial body measured at the known position at predetermined instants of time.

17. An astronomical position-finding chart bearing a representation of a geographical area, means for indicating azimuth with respect to a known position on the said representation, and a diagram graphically indicating altitudes and azimuths of a celestial body measured at the known position at predetermined instants of time.

18. An astronomical position-finding chart bearing a representation of a geographical area, a compass diagram overlying the said representation with its center coincident with a known position thereon and graduated in degrees of azimuth, and a plurality of circles of equal altitude delineated on the said representation concentric to the known position.

19. An astronomical position-finding chart bearing a representation of a geographical area, a compass diagram overlying the said representation with its center coincident with a known position thereon and graduated in degrees of azimuth, a plurality of circles of equal altitude delineated on the said representation concentric to the known position, and a record of the altitudes and azimuths of a celestial body measured at the known position at predetermined instants of time.

In testimony whereof I have affixed my signature.

GEORGE W. LITTLEHALES.

muth that a celestial body would have in the known position at predetermined instants of time.

12. The combination with an astronomical position-finding chart bearing a representation of a geographical area, a plurality of circles of equal altitude delineated on the said representation concentric to a known position thereon, and means for determining the value of the altitude and of the azimuth that a celestial body would have in the known position at predetermined instants of time.

13. The combination with an astronomical position-finding chart bearing a representation of a geographical area, a compass diagram overlying the said representation with its center coincident with a known position thereon, a plurality of circles of equal altitude delineated on the said representation concentric to the known position, and means for determining the value of the altitude and of the azimuth that a celestial body would have in the known position at predetermined instants of time.

14. An astronomical position-finding chart bearing a representation of a geographical area, means for indicating azimuth with respect to a known position on the said representation, and a record of the altitudes and azimuths of a celestial body measured at the known position at predetermined instants of time.

15. An astronomical position-finding chart bearing a representation of a geographical area, means for indicating altitude differences in a radial direction with respect to a known position on the said representation, and a record of the altitudes and azimuths of a celestial body measured at the known position at predetermined instants of time.

16. An astronomical position-finding chart bearing a representation of a geographical area, means for indicating azimuth with respect to a known position on the said representation, means for indicating altitude-differences in a radial direction with respect to the known position, and a record of the altitudes and azimuths of a celestial body measured at the known position at predetermined instants of time.

17. An astronomical position-finding chart bearing a representation of a geographical area, means for indicating azimuth with respect to a known position on the said representation, and a diagram graphically indicating altitudes and azimuths of a celestial body measured at the known position at predetermined instants of time.

18. An astronomical position-finding chart bearing a representation of a geographical area, a compass diagram overlying the said representation with its center coincident with a known position thereon and graduated in degrees of azimuth, and a plurality of circles of equal altitude delineated on the said representation concentric to the known position.

19. An astronomical position-finding chart bearing a representation of a geographical area, a compass diagram overlying the said representation with its center coincident with a known position thereon and graduated in degrees of azimuth, a plurality of circles of equal altitude delineated on the said representation concentric to the known position, and a record of the altitudes and azimuths of a celestial body measured at the known position at predetermined instants of time.

In testimony whereof I have affixed my signature.

GEORGE W. LITTLEHALES.

Certificate of Correction.

It is hereby certified that in Letters Patent No. 1,557,854, granted October 20, 1925, upon the application of George W. Littlehales, of Washington, District of Columbia, for an improvement in "Methods and Means for Finding Geographical Position in Navigation," errors appear in the printed specification requiring correction as follows: Page 4, line 65, strike out the equation (4)—

$$havZ = \frac{hav(90°\sim d) - hav(L-d)}{hav(180° - [L+d]) - hav(L-d)}$$

and insert instead—

$$havZ = \frac{hav(90°\sim d) - hav(L-h)}{hav(180° - [L+h]) - hav(L-h)};$$

page 5, line 99, before "12° 36′" insert the "—" sign; and that the said Letters Patent should be read with these corrections therein that the same may conform to the record of the case in the Patent Office.

Signed and sealed this 19th day of January, A. D. 1926.

[SEAL.]

WM. A. KINNAN,
*Acting Commissioner of Patents.*

Certificate of Correction.

It is hereby certified that in Letters Patent No. 1,557,854, granted October 20, 1925, upon the application of George W. Littlehales, of Washington, District of Columbia, for an improvement in "Methods and Means for Finding Geographical Position in Navigation," errors appear in the printed specification requiring correction as follows: Page 4, line 65, strike out the equation (4)—

$$havZ = \frac{hav(90°\sim d) - hav(L-d)}{hav(180° - [L+d]) - hav(L-d)}$$

and insert instead—

$$havZ = \frac{hav(90°\sim d) - hav(L-h)}{hav(180° - [L+h]) - hav(L-h)};$$

page 5, line 99, before "12° 36'" insert the "—" sign; and that the said Letters Patent should be read with these corrections therein that the same may conform to the record of the case in the Patent Office.

Signed and sealed this 19th day of January, A. D. 1926.

[SEAL.]

WM. A. KINNAN,
*Acting Commissioner of Patents.*